Patented Mar. 26, 1946

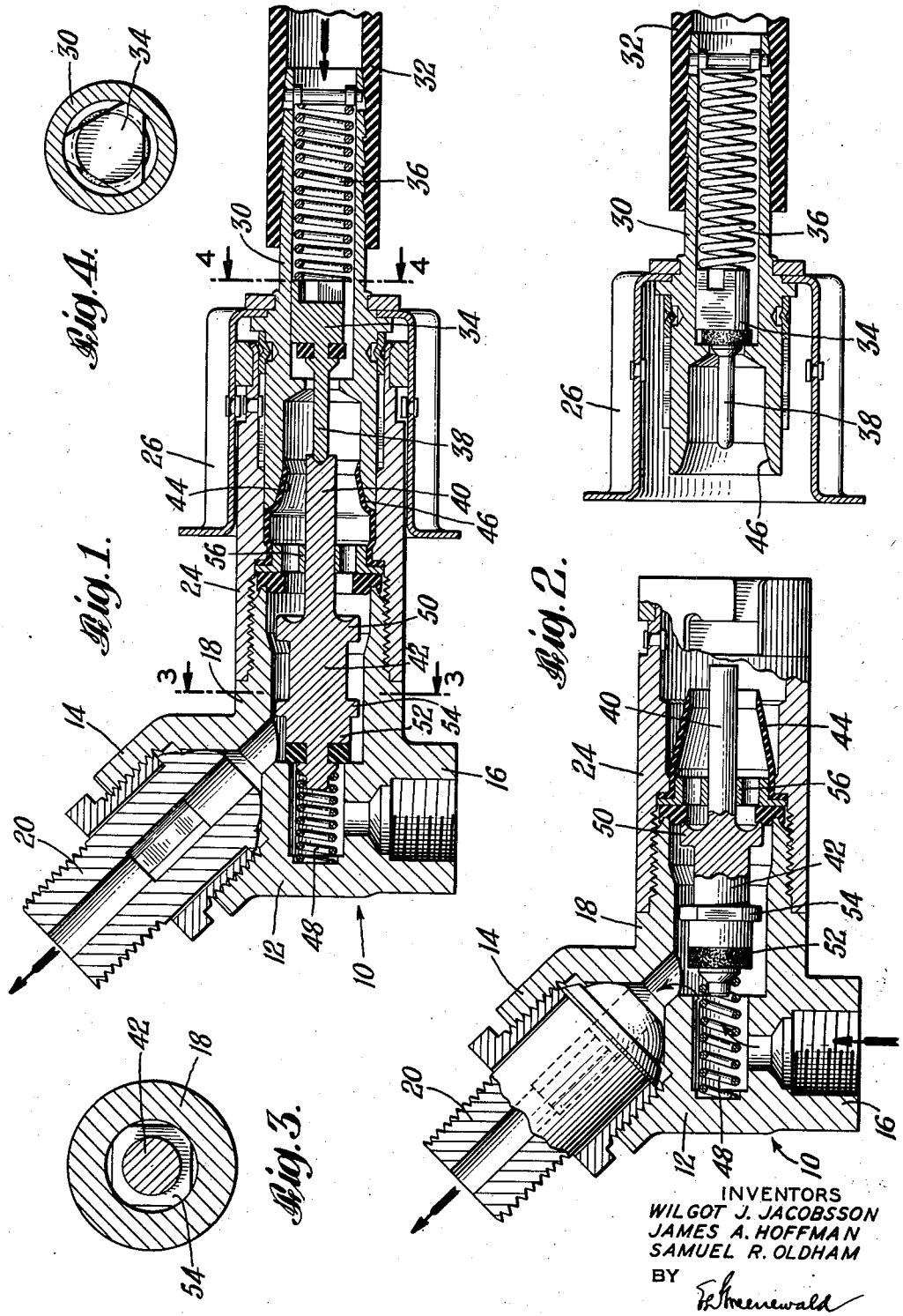

2,397,265

UNITED STATES PATENT OFFICE 2,397,265

BAILOUT INTERLOCK CONNECTION

Wilgot J. Jacobsson, Plainfield, James A. Hoffman, Roselle, and Samuel R. Oldham, West Orange, N. J., assignors to The Linde Air Products Company, a corporation of Ohio Application January 13, 1945, Serial No. 572,672

5 Claims. (Cl. 284—17)

This invention relates to a bailout interlock connection the purpose of which is threefold, i. e., to allow a person in a plane to free himself from an oxygen hose line which normally supplies him with oxygen from a common oxygen supply in the plane; to maintain uninterrupted his breathing oxygen supply by providing for immediate flow from a bailout oxygen supply when the common oxygen supply is disconnected; and to accomplish both of the above two functions by a single manipulation.

Other objects of the invention are to provide a bailout interlock device of this nature which is simple and economical in its parts, and efficient and effective in operation; and to incorporate improved means for preventing any waste of oxygen from either ship or bailout sources when the device is either connected to or disconnected from the plane oxygen supply.

Referring to the drawing:

Fig. 1 is a longitudinal cross-sectional view of a bailout interlock connection exemplifying the invention;

Fig. 2 is a somewhat similar view showing the position of the parts when disconnected from the plane oxygen supply;

Fig. 3 is a transverse section taken on line 3—3 of Fig. 1; and

Fig. 4 is a similar section taken on line 4—4 of Fig. 1.

The illustrated bailout interlock connection 10 consists of a Y-fitting consisting of a main body 12 having three branches 14, 16 and 18. The branch 14 is connected by suitable means, including a swivel nipple 20, to an individual flier's breathing regulator, not shown. The branch 16 is connected to an individual bailout regulator and auxiliary oxygen supply, not shown, and the branch 18 is connected by suitable means, including quickly disconnectable coupling units 24 and 26, to a common oxygen supply, not shown, in the plane. The quick disconnect coupling 24, 26 is preferably like that disclosed and claimed in co-pending application Serial No. 532,264, filed April 22, 1944.

The coupling unit 26 includes a nipple 30 which is connected to the plane oxygen supply by a flexible hose 32, and provided with an internal valve 34 which is urged toward closed position by a compression spring 36 disposed within the nipple. The valve 34 is provided with a bayonet 38 which is adapted to engage the stem 40 of a dual valve member 42 in the branch 18 of the connection 12 when the units 24 and 26 are coupled. At the same time a conical sealing membrane 44 of a suitable material which will be flexible over the range of temperatures encountered, such as anode or synthetic rubber in the coupling unit 24 engages a conical seat 46 on the inner end of the nipple 30, providing a very effective seal.

The springs 36 and 48 cooperate to take care of the opening and closing of the valves, 34, 50 and 52 in the manner described below.

The dual valve member 42 is urged to the right, as viewed in the drawing, by a compression spring 48 in the main body 12, so that, when the coupling units 24 and 26 are uncoupled, as shown in Fig. 2, valve 50 is shut and valve 52 is open. The dual valve member 52 is guided in the branch 18 of the body 12 by a polygonal flange 54, such guiding being assisted by an annular bearing 56 for the stem 40.

The dual valve member 42 operates, when the coupling units 24 and 26 are coupled, to allow oxygen to flow from the plane supply to the flier's breathing regulator, as shown in Fig. 1. In this case the valves 34 and 50 are open, while the valve 52 is closed. However, when the coupling units 24 and 26 are uncoupled, as shown in Fig. 2, the valve 52 is open, allowing oxygen to flow from the flier's individual oxygen supply and bailout regulator, to his breathing regulator. At the same time the valve 50 is closed by the spring 48, preventing any leakage of oxygen to the atmosphere from the device 10; and the valve 34 in the coupling unit 26 is closed by the spring 36, preventing any leakage of oxygen to the atmosphere from the plane oxygen supply.

Thus, it is clear that when the bailout interlock device is connected to the plane oxygen supply, oxygen flows from such supply to the flier's breathing regulator, while the bailout valve 52 is closed. When the plane connection is broken, however, by uncoupling the units 24 and 26, the bailout valve 52 opens and the other two valves 34 and 50 close, allowing oxygen to flow from the bailout regulator to the flier's breathing regulator, but preventing any flow of oxygen to the atmosphere from either the body 12 or the coupling unit 26.

What is claimed is:

1. A bailout interlock connection comprising, in combination, a body having three branches consisting of a flier's breathing regulator branch, a bailout oxygen supply branch and a plane oxygen supply branch, a dual valve member in the last-named branch having a bailout valve and a plane oxygen supply valve, a spring in said body normally acting to urge said valve member in a position such that the bailout valve is open and the plane oxygen supply valve is shut, a quick disconnect coupling comprising a coupling unit attached to said plane oxygen suply branch, and a coupling unit connected to the plane oxygen supply, the last-named unit comprising a valve and a spring urging said valve toward closed position, said last-named valve being provided with a bayonet, and said dual valve being provided with a stem for cooperation of said bayonet when the coupling units are coupled, and said springs cooperating therewith, so that the bailout valve is closed and the other two valves are open, allowing oxygen to flow from the plane oxygen supply to the flier's breathing regulator, and when the coupling units are uncoupled, the bailout valve is opened, allowing oxygen to flow from the bailout oxygen supply to the flier's breathing apparatus, and both the other two valves are closed, preventing any escape of oxygen to the atmosphere from either the body or the coupling unit attached to the plane oxygen supply.

2. A bailout interlock connection comprising, in combination, a body having three branches consisting of a flier's breathing regulator branch, a bailout oxygen supply branch and a plane oxygen supply branch, a dual valve member in the last-named branch having a bailout valve and a plane oxygen supply valve, and a spring in said body normally acting to urge said valve member in a position such that the bailout valve is open and the plane oxygen supply valve is shut, said dual valve being provided with a stem at one end through which the dual valve is moved against the force of said spring to close the bailout valve and open the plane oxygen supply valve.

3. In combination, a fluid fitting having three branches, a dual valve member in one of such branches, a spring urging said member to close one valve and open the other, a fluid-pressure sealed coupling including a unit attached to such branch and a unit provided with a valve and a valve closing spring, said valve member and said last-named valve having means acting when said units are coupled, to cause said valve closing spring to overcome the force of said first spring and move said valve member to open said one valve and close said other valve, said means also acting to open the valve provided in said unit, providing a fluid communication path through said coupling and another branch, the arrangement being such that, when the units are uncoupled, another fluid communication path is established through the fitting between said last-named branch and the third branch and leakage of fluid is prevented from the branch containing said dual valve member as well as the coupling unit provided with the spring closed valve.

4. In combination, a Y-fitting having one branch connected to an individual breathing device, a second branch connected to a common oxygen supply, and a third branch connected to an individual auxiliary oxygen supply, a dual valve in said second branch normally providing communication between the common oxygen supply and the breathing device, and stopping communication between the breathing device and the auxiliary oxygen supply, a quick disconnect coupling between said second branch and said main oxygen supply including a normally open valve which is adapted to close, when the coupling is disconnected, and prevent waste of oxygen from said common oxygen supply, said dual valve being operated when said coupling is disconnected, to seal said second branch and provide communication between the breathing device and the auxiliary oxygen supply.

5. A bailout interlocking device comprising a main source unit and an auxiliary source unit, said main source unit including means for providing communication between a breathing apparatus and a main gas supply and means for concurrently sealing off an auxiliary gas supply when said units are coupled, and said auxiliary source unit including means for providing communication between said breathing apparatus and an auxiliary gas supply and means for automatically and concurrently sealing off said main gas supply when said units are uncoupled.

WILGOT J. JACOBSSON.
JAMES A. HOFFMAN.
SAMUEL R. OLDHAM.